No. 838,462. PATENTED DEC. 11, 1906.
L. M. SARTAIN.
SELF LOCKING NUT AND BOLT.
APPLICATION FILED JUNE 4, 1906.

Louis M. Sartain,
INVENTOR.

WITNESSES:

By C. A. Snow & Co.
ATTORNEYS

UNITED STATES PATENT OFFICE.

LOUIS MARTAIN SARTAIN, OF TRACY CITY, TENNESSEE, ASSIGNOR TO JOSEPH L. OLIVER, OF TRACY CITY, TENNESSEE.

SELF-LOCKING NUT AND BOLT.

No. 838,462.  Specification of Letters Patent.  Patented Dec. 11, 1906.

Application filed June 4, 1906. Serial No. 320,215.

*To all whom it may concern:*

Be it known that I, LOUIS MARTAIN SARTAIN, a citizen of the United States, residing at Tracy City, in the county of Grundy and State of Tennessee, have invented a new and useful Self-Locking Nut and Bolt, of which the following is a specification.

This invention relates to improvements in nut-locks applicable to cap, bur, and other nuts, and is designed for use with bolts employed in locomotives, stationary engines, automobiles, rail-joints, and any other apparatus having parts bolted together.

The objects of the invention are to simplify and improve the construction of this class of devices, so that they are inexpensive to manufacture, easy to apply and remove without marring or scarring the threads of the bolt, and consist of few parts, so that derangement is reduced to a minimum.

With these and other objects in view, as will appear as the nature of the invention is better understood, the same comprises the various novel features of construction and arrangement of parts hereinafter described, and set forth with particularity in the claims appended hereto.

Figure 1:
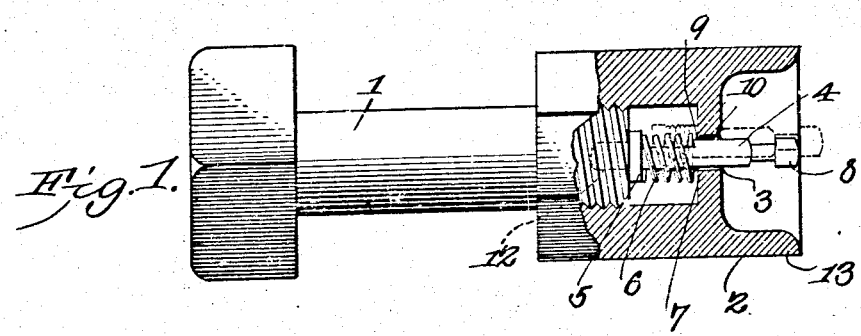
Figure 2:
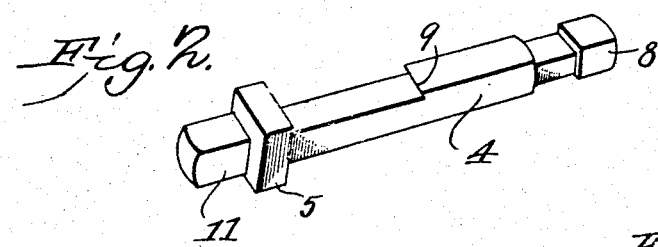
Figure 3:
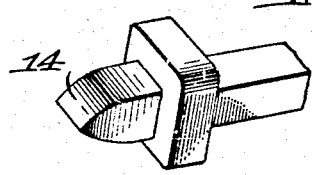
Figure 4:
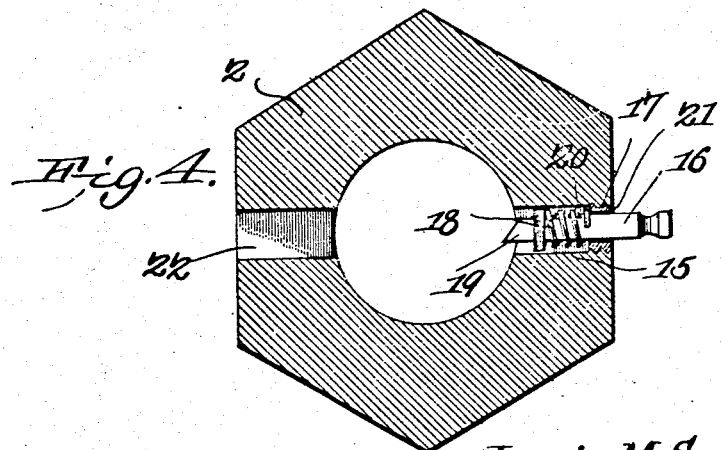

In the accompanying drawings, which illustrate one embodiment of the invention, Figure 1 is a side elevation of a bolt and nut, showing the latter in partial section. Fig. 2 is a perspective view of the locking member of a device drawn on a slightly-enlarged scale. Fig. 3 is a detail perspective view of a modified form of the locking member. Fig. 4 is a transverse section of a bur-nut, showing the locking device applied thereto.

Corresponding parts in the several figures are indicated throughout by similar characters of reference.

Referring to the drawings, 1 designates a bolt having a threaded shank on which is screwed the cap-nut 2. The cap-nut is provided with an axially-extending bore 3 for receiving the locking member 4. The locking member 4 is preferably of angular cross-section, and the bore or aperture in the nut is of corresponding shape, so as to prevent relative turning between the parts. The inner end of the locking member 4 is enlarged at 5 to form an abutment for one end of the compression-spring 6. The compression-spring is disposed around the locking member and housed in the nut 2, with the end opposite the abutment 5 abutting the inner end wall 7 of the nut. The locking member projects to a point outside the nut and is preferably reduced adjacent its end to form a knob 8 for facilitating the member being gripped, so that it can be drawn outwardly against the tension of the spring. The locking member is provided with a shoulder 9 at one side, which is slightly undercut, so as to engage a correspondingly cut shoulder in the end surface of the nut, as indicated at 10, when the locking member is withdrawn to the position shown by dotted lines in Fig. 1. The inner end of the locking member is provided with a key-like projection 11, that is angular or polygonal in cross-section and is adapted to engage in a correspondingly-shaped socket in the end of the bolt, as indicated at 12.

In some cases it may be found desirable to protect the projecting end of the locking member, and for this purpose the cap-nut is provided with a rim 13, forming thereby a cavity at the end of the nut in which the locking member is completely protected when in a set position. In order to adapt the invention to bolts already in use, a chisel-shaped projection 14 is provided on the inner end of the locking member, as shown in the modification in Fig. 3. To enable the locking member to better engage the bolt, the end surface of the latter is preferably slotted to a slight depth by means of a hacksaw or other device.

Referring to Fig. 4, which shows the invention adapted to a bur-nut, the nut is bored from one side into the tapped bore thereof and into the opposite wall. The opening or passage 15 thus formed receives the locking member 16. The end of the passage 15 is provided with an apertured plug 17, whose aperture is preferably square or of any other angular cross-section, so as to fit the shank of the locking member. The inner end of the plug forms a shoulder for receiving the outer end of the compression-spring 18.

Instead of forming the shoulder by means of the apertured plug the passage 15 may be cast or otherwise formed with the shoulder integral with the nut. The tooth or projection 19 on the inner end of the locking member is preferably wedge-shaped, so as to bite into the threads of the bolt and thereby prevent the nut from unscrewing. When it is desired to remove the nut, the knob of the locking member is taken hold of by the fingers and withdrawn sufficiently to cause the shoulder 20 to be seated on the portion 21 of the nut and thereby held. The nut can then be unscrewed without the threads being marred. The passage 22 on the opposite side of the nut is provided for the purpose of inserting the locking member.

In applying the nut to a bolt the locking member is first temporarily locked in the position shown by dotted lines in Fig. 1. To set the locking member to this position, it is first pulled outwardly in an axial direction against the tension of its spring to such a distance that the shoulder thereof is on a level with the shoulder of the end surface of the nut, and then by a transverse or lateral movement the shoulders are engaged. This permits the nut to be readily screwed home on the bolt without the locking member interfering. After the nut is screwed into place the locking member is moved laterally, so that the interlocking shoulders will disengage and the member drawn in to its operative position by the compression-spring. This position is shown in full lines in Fig. 1, the angular projection on the inner end of the locking member being seated in the socket in the bolt. The bolt is thus prevented from working loose, but can be readily removed when desired.

I have described the principle of operation of the invention, together with the apparatus which I now consider to be the best embodiment thereof; but I desire to have it understood that the apparatus shown is merely illustrative and that various minor changes and modifications may be made, when desired, in accordance with the scope of the invention.

What I claim is—

1. A nut-lock, comprising a nut having an opening, a member mounted in the opening of the nut to have a longitudinal and a limited lateral movement, means on the body of the member coöperating with the said opening for positively preventing rotation of the member independently of the nut, interlocking portions on the body of the member and on the outside of the nut at the openings thereof which are engaged first by an outward and then a lateral movement of the member, and a spring arranged to hold the member in its locking position and to hold the said interlocking portions in engagement when the said member is in unlocked position.

2. A nut-lock comprising a nut, a member mounted in the nut to have a longitudinal and a limited lateral movement, means on the nut for engaging the member to positively prevent rotation thereof independently of the nut, interlocking portions on the member and nut which are engaged by first an outward and then a lateral movement of the member, and a spring arranged to hold the said member in its locking position.

3. A nut-lock comprising a nut having an end rim extending in an axial direction and an angular perforation, a locking member arranged in the perforation and extending from a point within to a point without the nut, and a spring tending to maintain the member indrawn, said member comprising a single-piece structure having an enlargement and projection at one end, a knob at the opposite end, and a shoulder intermediate the ends thereof.

In testimony that I claim the foregoing as my own I have hereto affixed my signature in the presence of two witnesses.

LOUIS MARTAIN SARTAIN.

Witnesses:
H. J. SMITH,
TURNEY RODDY.